(12) United States Patent
Chen (10) Patent No.: US 7,075,206 B1
(45) Date of Patent: Jul. 11, 2006

(54) VEHICLE ALTERNATOR STATOR WINDING HAVING DUAL SLOT CONFIGURATION

(75) Inventor: Hanyang B. Chen, Ypsilanti, MI (US)

(73) Assignee: Visteon Global Technologies, Inc., Van Buron Township, MI (US)

( * ) Notice: Subject to any disclaimer, the term of this patent is extended or adjusted under 35 U.S.C. 154(b) by 0 days.

(21) Appl. No.: 11/053,069

(22) Filed: Feb. 7, 2005

(51) Int. Cl.
*H02K 1/12* (2006.01)

(52) U.S. Cl. .................. 310/179; 310/184; 310/254

(58) Field of Classification Search .............. 310/179, 310/184, 198, 203, 208, 254, 258, 259–260
See application file for complete search history.

(56) References Cited

U.S. PATENT DOCUMENTS

| | | | |
|---|---|---|---|
| 1,711,979 A * | 5/1929 | Weinert | 310/202 |
| 3,035,222 A | 5/1962 | Stone | |
| 4,328,427 A | 5/1982 | Bond | |
| 4,484,125 A | 11/1984 | Hertz | |
| 4,675,591 A | 6/1987 | Pleiss | |
| 5,068,587 A | 11/1991 | Nakamura | |
| 5,614,799 A | 3/1997 | Anderson et al. | |
| 5,691,590 A | 11/1997 | Kawai et al. | |
| 5,714,821 A | 2/1998 | Dittman | |
| 5,821,660 A | 10/1998 | Anderson | |
| 5,982,067 A | 11/1999 | Sebastian et al. | |
| 5,994,802 A | 11/1999 | Shichijyo et al. | |
| 6,121,707 A | 9/2000 | Bell et al. | |
| 6,144,136 A | 11/2000 | Umeda et al. | |
| 6,331,760 B1 | 12/2001 | McLane, Jr. | |
| 6,359,361 B1 * | 3/2002 | Wakui et al. | 310/179 |
| 6,417,592 B1 * | 7/2002 | Nakamura et al. | 310/184 |
| 6,455,974 B1 | 9/2002 | Fogarty | |
| 6,472,790 B1 | 10/2002 | Rose, Sr. | |
| 6,522,043 B1 | 2/2003 | Masegi | |
| 6,552,463 B1 | 4/2003 | Oohashi et al. | |
| 6,570,289 B1 | 5/2003 | Liang et al. | |
| 6,704,993 B1 | 3/2004 | Fogarty | |
| 6,784,583 B1 | 8/2004 | Umeda | |
| 2002/0053851 A1 | 5/2002 | Kreuzer | |
| 2004/0081561 A1 | 4/2004 | Iwanami et al. | |
| 2004/0119359 A1 * | 6/2004 | Neet | 310/184 |
| 2005/0212372 A1 * | 9/2005 | Akita et al. | 310/180 |

FOREIGN PATENT DOCUMENTS

| | | |
|---|---|---|
| JP | 59-201695 | 11/1984 |
| JP | 03-277154 | 12/1991 |

* cited by examiner

*Primary Examiner*—Thanh Lam
(74) *Attorney, Agent, or Firm*—Brinks Hofer Gilson & Lione (57) ABSTRACT

A stator for an electric machine includes a stator core having a plurality of circumferentially-spaced and axially-extending core slots. The core slots extend between a first and a second end of the stator core and a stator winding having a plurality of phases is positioned therein. Each of the phases includes a first pair of conductors connected in parallel and a second pair of conductors connected in parallel, in turn connected to one another in series to define a single phase of the stator winding. The first pair of conductors and the second pair of conductors occupy adjacent slots such that each single phase of the stator winding occupies two adjacent slots within the stator core. Each conductor has a plurality of slot segments housed in the core slots that are alternately connected at the ends of the stator core by a plurality of end loop segments.

18 Claims, 9 Drawing Sheets

VEHICLE ALTERNATOR STATOR WINDING HAVING DUAL SLOT CONFIGURATION

FIELD OF THE INVENTION

The present invention relates generally to electric machines and, in particular, to a stator having a dual slot configuration.

BACKGROUND OF THE INVENTION

Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of slot segments that are located in the core slots and end loop segments that connect two adjacent slot segments of each phase and are formed in a predetermined multi-phase (e.g. three or six) winding pattern in the slots of the stator core.

The rotor assembly can be any type of rotor assembly, such as a "claw-pole" rotor assembly, which typically includes opposed poles as part of claw fingers that are positioned around an electrically charged rotor coil. The electric current in the rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing alternating electrical currents in the stator windings in a well known manner. The alternating electrical currents are then routed from the alternator to a distribution system for consumption by electrical devices or, in the case of an automotive alternator, to a rectifier and then to an automobile battery.

One type of device is a high slot fill stator, which is characterized by rectangular shaped conductors whose width, including any insulation fit closely to the width, including any insulation of the rectangular shaped core slots. High slot fill stators are advantageous because they are efficient and help produce more electrical power per winding than other types of prior art stators.

One disadvantage of the high slot fill stators is the difficulty of providing alternators that provide different dc output currents. Currently, alternators for different applications are developed and manufactured independently such that each application required a completely different alternator. The tooling and manufacturing costs associated with providing many different alternators is very high. Therefore, there is a need for an alternator that can easily be modified to provide lower dc output currents while using the same stator core and winding.

SUMMARY OF THE INVENTION

A stator for a dynamoelectric machine according to the present invention includes a generally cylindrically-shaped stator core having a plurality of circumferentially-spaced and axially-extending core teeth that define a plurality of circumferentially-spaced and axially-extending core slots in a surface thereof. The core slots extend between a first and a second end of the stator core. The stator also includes a multi-phase stator winding. Each of the phases includes a plurality of slot segments disposed in the core slots that are alternately connected at the first and second ends of the stator core by a plurality of end loop segments. The slot segments and likely the end loop segments of a high slot fill winding are typically rectangular in cross sectional shape. The end loop segments of the winding may be interlaced or cascaded. An interlaced winding includes a majority of end loops that connect a slot segment housed in one core slot and in one radial position with a slot segment housed in another core slot in a different radial position.

In contrast, a cascaded winding includes a majority of end loop segments that connect a slot segment housed in one radial position of a core slot with another slot segment housed in the same radial position of another core slot. The term radial position, utilized herein, refers to the position of a slot segment housed in the core slots with respect to the other slot segments housed in the same core slot—i.e. the outermost slot segment housed in a core slot is defined as being located in the outermost radial position, the second outermost slot segment housed in a slot is defined as being located in the second outermost radial position, and so forth. The term, conductor portion, utilized herein, is defined as being a portion of a conductor that includes at least three consecutive slot segments connected by at least two end loop segments. A cascaded winding is further defined as a winding including a plurality of conductor portions of all of the phases located in the same general circumferential location, wherein all of the conductor portions could be sequentially radially inserted from the central axis of the stator core.

The stator winding has a plurality of phases. Each phase includes a first pair of conductors connected in parallel and a second pair of conductors connected in parallel. The first pair of conductors is connected in series to the second pair of conductors to define a single phase of the stator winding. The first pair of conductors and the second pair of conductors occupy adjacent slots within the stator core such that each single phase of the stator winding occupies two adjacent slots within the stator core. The two conductors of each of the first and second pairs of conductors alternate radial positions within respective slots within the stator core.

In one aspect of the present application, the stator winding includes three phases, the three phases being connected to one another in a delta configuration. In another aspect, the stator winding includes three phases connected to one another in a wye configuration having a single neutral point. In yet another aspect, the stator winding includes three phases connected to one another in a wye configuration having two neutral points.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7b is a perspective view of a plurality of layers of end loop segments of a stator winding in accordance with the present invention including the layer of FIG. 7a;

DESCRIPTION OF THE EMBODIMENTS

Figure 1:
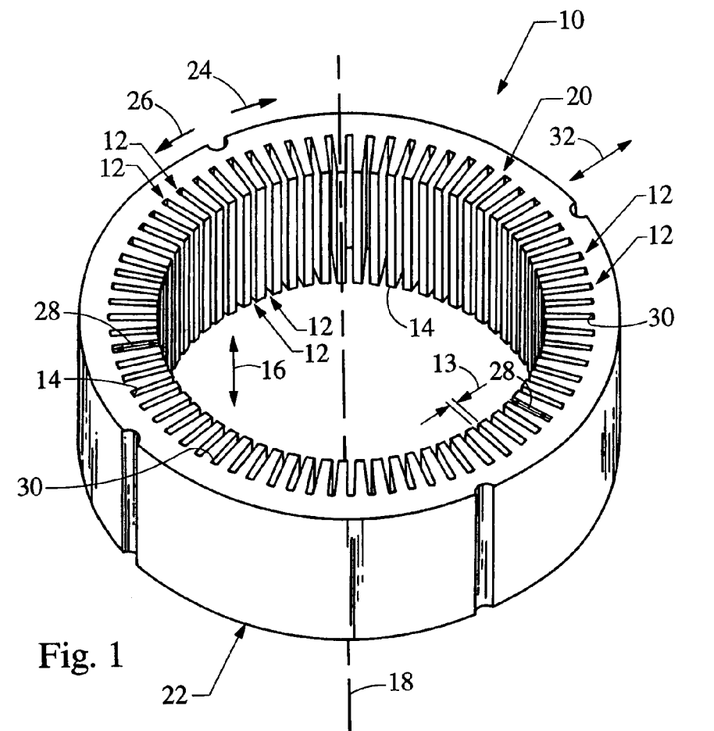
FIG. 1 is a perspective view of a stator core in accordance with the present invention prior to insertion of the stator winding.

Referring now to FIG. 1, a generally cylindrically-shaped stator core is indicated generally at 10. The stator core 10 includes a plurality of core slots 12 formed in a circumferential inner diameter 14 thereof. The core slots 12 extend in an axial direction, indicated by an arrow 16, parallel to a central axis 18 of the stator core 10 between a first end 20 and a second end 22 thereof. An axially upward direction is defined as moving toward the first end 20 of the stator core 10 and an axially downward direction is defined as moving toward the second end 22 of the stator core 10.

Preferably, the core slots 12 are equally spaced around the circumferential inner diameter 14 of the stator core 10. A circumferential clockwise direction is indicated by an arrow 24 and a circumferential counterclockwise direction is indicated by an arrow 26.

The core slots 12 define a radial depth 28, between ends 30 of the core slots 12 and the inner diameter 14 of the stator core 10. This radial depth 28 is along radial direction, indicated by arrow 32. The core slots 12 are adapted to receive a stator winding, discussed in more detail below. A radial inward direction is defined as moving towards the central axis 18 of the stator core 10 and a radial outward direction is defined as moving away from the central axis 18. The core slots 12 may have rectangular cross sectional shape as can be seen in FIG. 1.

The stator winding 50 includes a plurality of phases 34. Each of the phases 34 includes a first set of conductors 36, 38 connected in parallel and a second set of conductors 40, 42 connected in parallel. In the examples cited herein the first and second sets of conductors each include two conductors forming first and second pairs. It is to be understood that the first and second sets of conductors can include any appropriate number of conductors connected to one another in parallel. The first pair of conductors 36, 38 is connected in series to the second pair conductors 40, 42 to define a single phase 34 of the stator winding 50.

Figure 2:
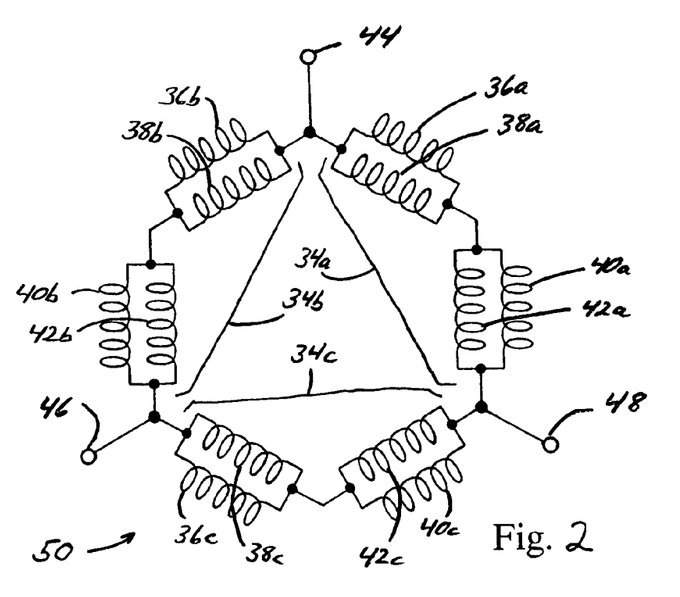
FIG. 2 is a schematic view of a three phase winding connected in a delta configuration.
Figure 3:
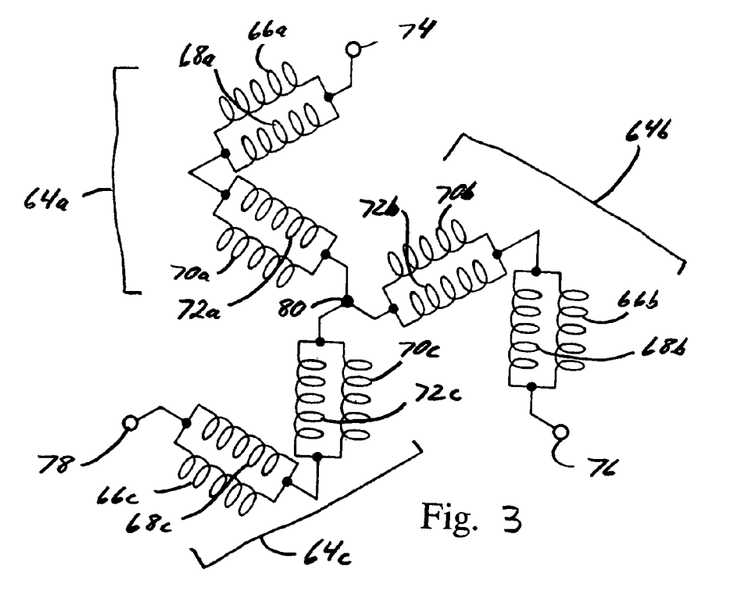
FIG. 3 is a schematic view of a three phase winding connected in a wye configuration having a single neutral point.
Figure 4:
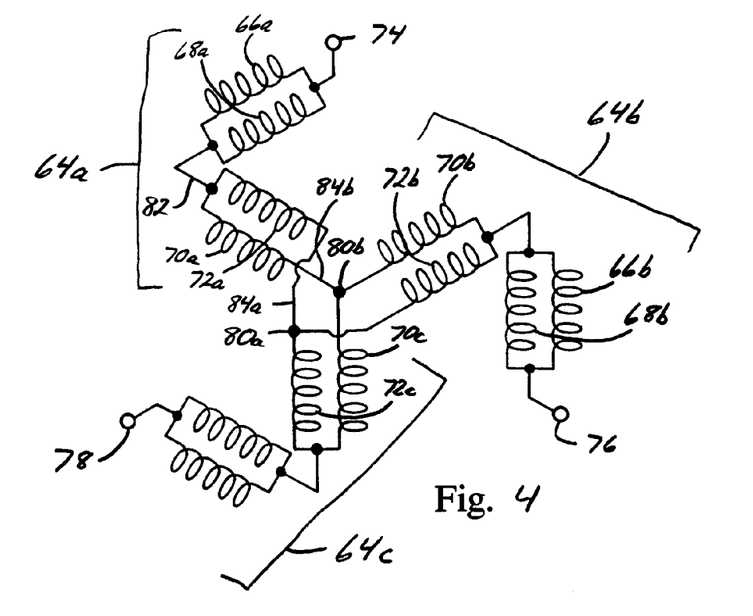
FIG. 4 is a schematic view of a three phase winding connected in a wye configuration having two neutral points.

FIGS. 2, 3, and 4 are schematic views of different embodiments as described herein. In a three phase stator winding 50, the phases 34a, 34b, 34c can be connected in a delta configuration such as shown in FIG. 2. A first phase 34a includes a first pair of conductors 36a, 38a and a second pair of conductors 40a, 42a. The first pair of conductors 36a, 38a includes a first conductor 36a and a second conductor 38a that are connected to one another in parallel. The second pair of conductors 40a, 42a also includes a first conductor 40a and a second conductor 42a that are connected to one another in parallel. The first pair 36a, 38a and the second pair 40a, 42a are connected to one another in series to form a single phase 34a of the winding 50.

A second phase-34b includes a first pair of conductors 36b, 38b and a second pair of conductors 40b, 42b. The first pair of conductors 36b, 38b includes a first conductor 36b and a second conductor 38b that are connected to one another in parallel. The second pair of conductors 40b, 42b also includes a first conductor 40b and a second conductor 42b that are connected to one another in parallel. The first pair 36b, 38b and the second pair 40b, 42b are connected to one another in series to form a single phase 34b of the winding 50.

Finally, a third phase 34c includes a first pair of conductors 36c, 38c and a second pair of conductors 40c, 42c. The first pair of conductors 36c, 38c includes a first conductor 36c and a second conductor 38c that are connected to one another in parallel. The second pair of conductors 40c, 42c also includes a first conductor 40c and a second conductor 42c that are connected to one another in parallel. The first pair 36c, 38c and the second pair 40c, 42c are connected to one another in series to form a single phase 34c of the winding 50.

Opposite ends of the three phases 34a, 34b, 34c are connected to one another at connection points 44, 46, and 48. These connection points 44, 46, 48 are then connected to rectifying diodes (not shown).

Alternatively, three phases 64a, 64b, 64c can be connected in a wye configuration such as that shown in FIG. 3. A first phase 64a includes a first pair of conductors 66a, 68a and a second pair of conductors 70a, 72a. The first pair of conductors 66a, 68a includes a first conductor 66a and a second conductor 68a that are connected to one another in parallel. The second pair of conductors 70a, 72a also includes a first conductor 70a and a second conductor 72a that are connected to one another in parallel. The first pair 66a, 68a and the second pair 70a, 72a are connected to one another in series to form a single phase 64a of the winding 50.

A second phase 64b includes a first pair of conductors 66b, 68b and a second pair of conductors 70b, 72b. The first pair of conductors 66b, 68b includes a first conductor 66b and a second conductor 68b that are connected to one another in parallel. The second pair of conductors 70b, 72b also includes a first conductor 70b and a second conductor 72b that are connected to one another in parallel. The first pair 66b, 68b and the second pair 70b, 72b are connected to one another in series to form a single phase 64b of the winding 50.

Finally, a third phase 64c includes a first pair of conductors 66c, 68c and a second pair of conductors 70c, 72c. The first pair of conductors 66c, 68c includes a first conductor 66c and a second conductor 68c that are connected to one another in parallel. The second pair of conductors 70c, 72c also includes a first conductor 70c and a second conductor 72c that are connected to one another in parallel. The first pair 66c, 68c and the second pair 70c, 72c are connected to one another in series to form a single phase 64c of the winding 50.

One end of each of the three phases 64a, 64b, 64c is connected to a neutral point 80, and the opposite ends of the three phases 64a, 64b, 64c define connection points 74, 76, 78. These connection points 74, 76, 78 are then connected to rectifying diodes (not shown).

In a modification of the embodiment shown in FIG. 3, the three phases can also be connected in a wye configuration having two neutral points 80a, 80b, such as that shown in FIG. 4. The first phase 64a includes a first pair of conductors 66a, 68a and a second pair of conductors 70a, 72a. The first pair of conductors 66a, 68a includes a first conductor 66a and a second conductor 68a that are connected to one another in parallel. The second pair of conductors 70a, 72a also includes a first conductor 70a and a second conductor 72a that are connected to one another at a first end 82.

The first pair 66a, 68a and the first end 82 of the second pair 70a, 72a are connected to one another in series. Second ends 84 of the second pair of conductors 70a, 72a are connected alternately to a first neutral point 80a and a second neutral point 80b. The second end 84 of one of the second pair of conductors 70a, 72a is connected to the first neutral point 80a. The second end 84b of the other one of the second pair of conductors 70a, 72a is connected to the second neutral point 80b. The second phase 64b and the third phase 64c are substantially the same. The opposite ends of the first pair of conductors for the three phases 64a, 64b, 64c define connection points 74, 76, 78, which are connected to rectifying diodes (not shown).

Figure 5:
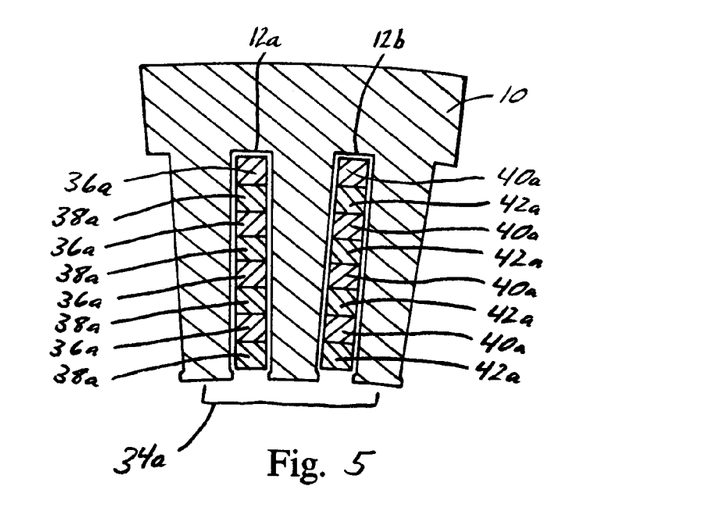
FIG. 5 is a cross sectional view of a portion of the stator showing one phase of the winding in two adjacent slots.

FIG. 5 is a sectional view of a stator core 10 with the stator winding 50 in place within the slots 12. Referring to FIG. 5, two adjacent slots 12a, 12b of the stator core 10 are shown. The winding 58 shown in FIG. 5 is the winding 50 that is shown schematically in FIG. 2. The first pair of conductors 36a, 38a and the second pair of conductors 40a, 42a occupy adjacent slots 12a, 12b within the stator core 10 such that the single phase 34a of the stator winding 50 occupies two adjacent slots 12a and 12b, within the stator core 10. The two slots shown in FIG. 5 illustrate one phase 34a. As shown, the first and second conductors 36a, 38a, 40a, 42a alternate radial positions within the respective slots 12a, 12b.

Figure 6:
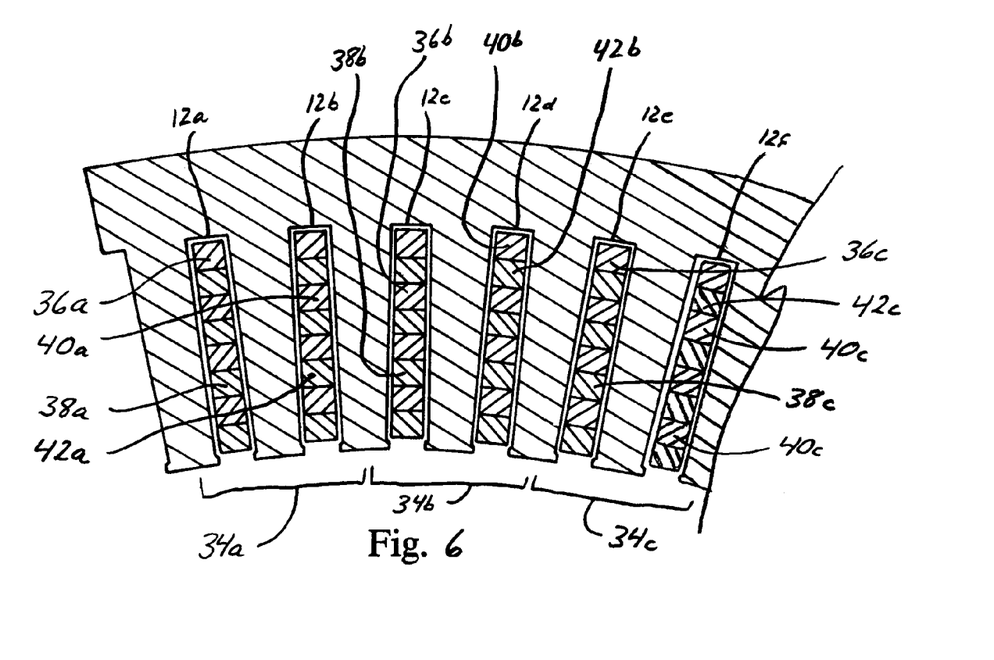
FIG. 6 is a cross sectional view similar to FIG. 5 showing three phases of the winding in six consecutive slots.

Referring to FIG. 6, six consecutive slots 12a–12f of the stator core 10 are shown to illustrate how all three phases 34a, 34b, 34c fit within the stator core 10.

The first pair of conductors 36a, 38a and the second pair of conductors 40a, 42a occupy adjacent slots 12a, 12b within the stator core 10 such that phase one 34a of the stator winding 50 occupies two adjacent slots 12a and 12b, within the stator core 10. The first pair of conductors 36b, 38b and the second pair of conductors 40b, 42b occupy adjacent slots 12c, 12d within the stator core 10 such that phase two 34b of the stator winding 50 occupies two adjacent slots 12c and 12d, within the stator core 10. And, finally, the first pair of conductors 36c, 38c and the second pair of conductors 40c, 42c occupy adjacent slots 12e, 12f within the stator core 10 such that phase three 34c of the stator winding 50 occupies two adjacent slots 12e and 12f, within the stator core 10.

Figure 2A:
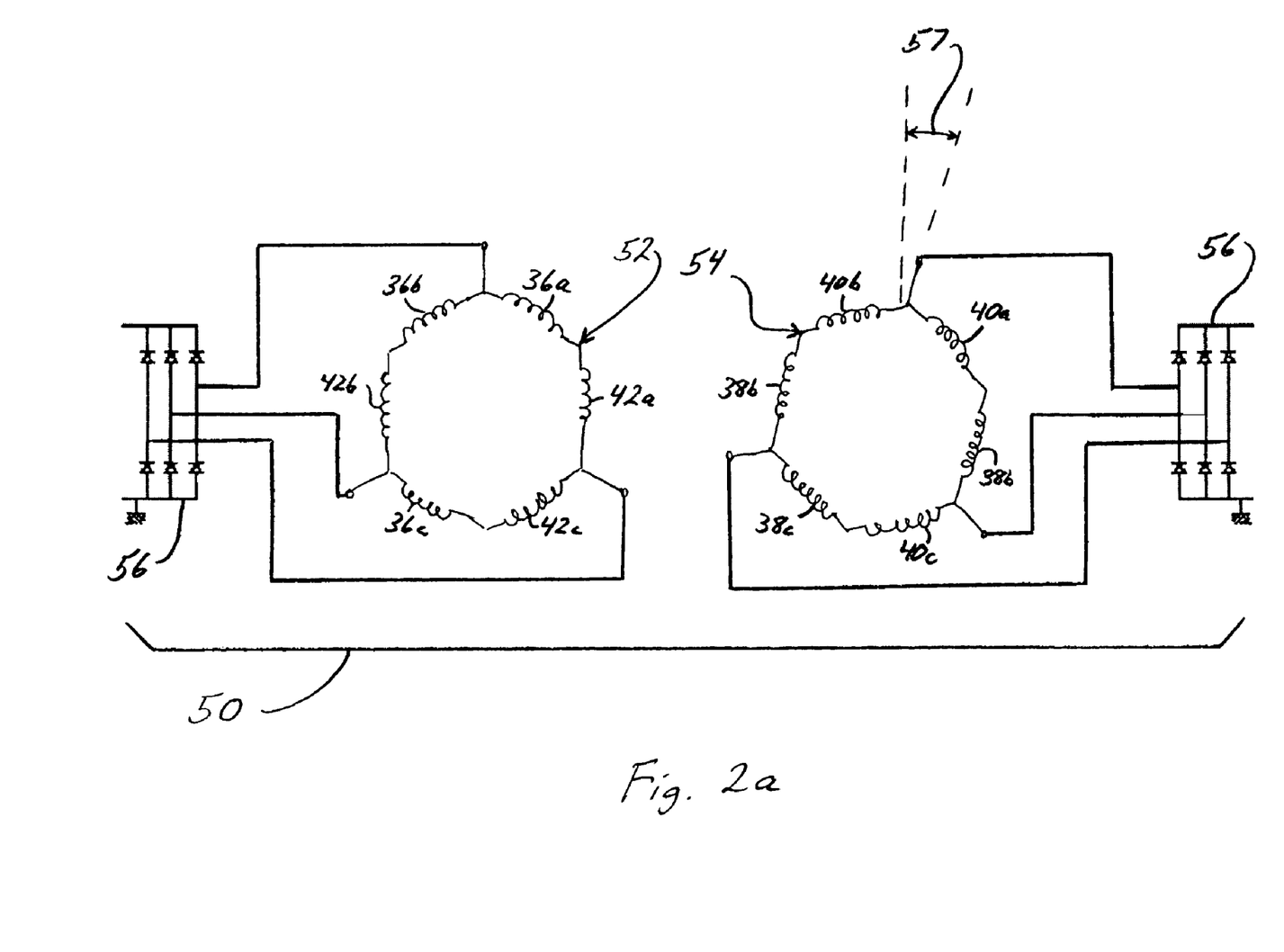
FIG. 2a is a schematic view of a six phase winding connected in a dual delta configuration.

In an alternate embodiment, the stator windings are connected as six-phase dual-delta, as shown in FIG. 2a, or six-phase dual-wye configuration. In FIG. 2a, conductor sets 36 and 42 are connected in a first delta configuration 52, and conductor sets 38 and 40 are connected in a second delta configuration 54. Each delta configuration 52. 54 is connected directly to a rectifier 56. Basically the first delta configuration 52 is identical to the second delta configuration 54, but with a stator slot shifting 57 between these two configurations 52, 54. Although in FIG. 2a, conductor sets 36, 38, 40, 42 are shown as single conductors, each of these conductor sets can also comprise multiple conductors connected in parallel. This concept can also be used for a six-phase dual-wye configuration.

Figure 7:
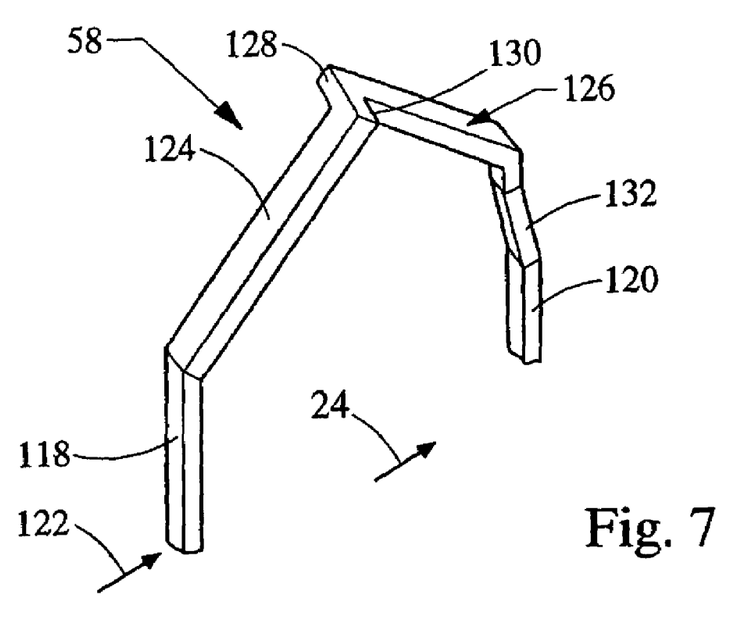
FIG. 7 is a perspective view of an end loop segment of a portion of a stator winding in accordance with the present invention.
Figure 7A:
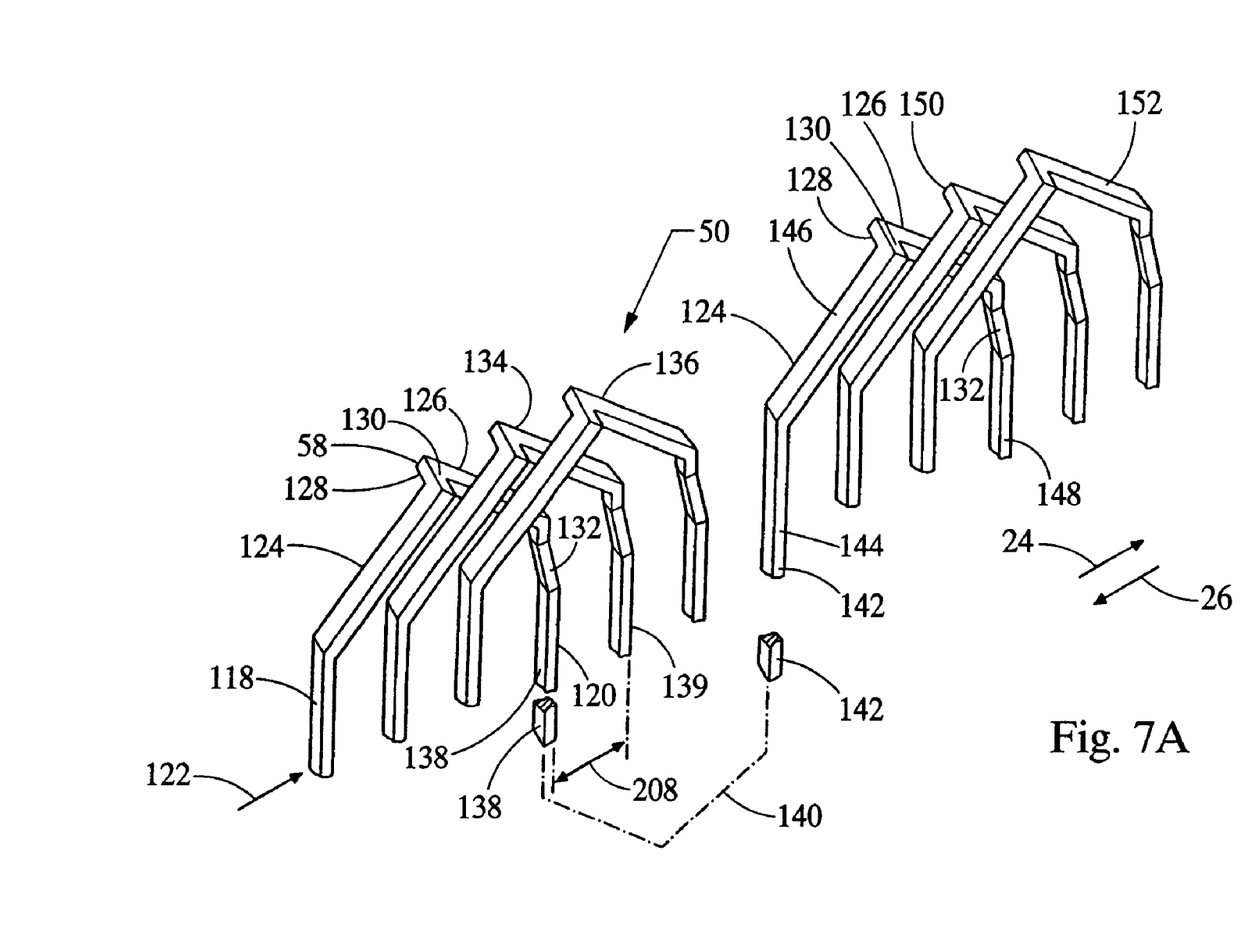
FIG. 7a is a perspective view of a layer of end loop segments of a portion of a stator winding in accordance with the present invention including the end loop segment of FIG. 7.
Figure 7B:
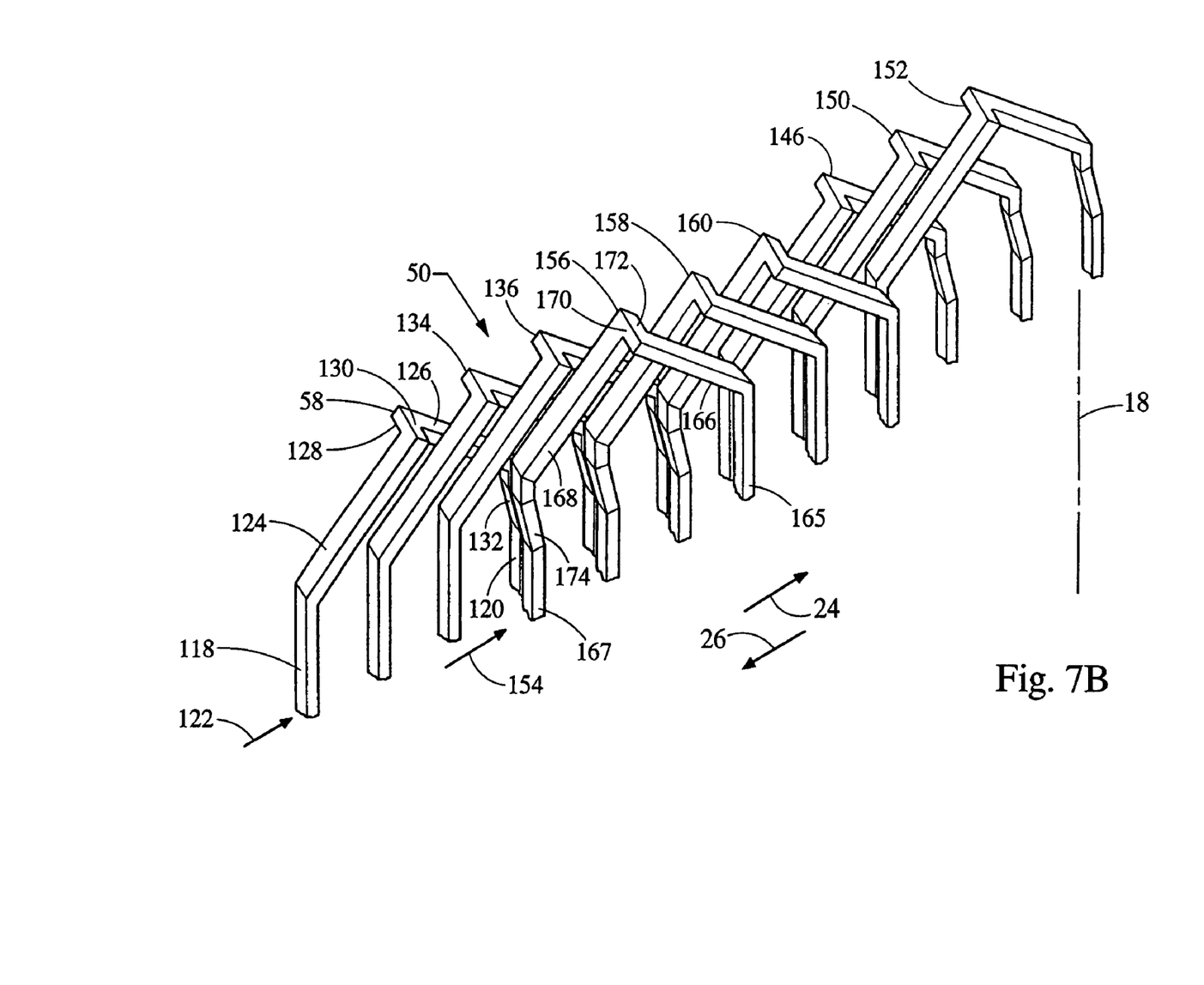
Figure 7C:
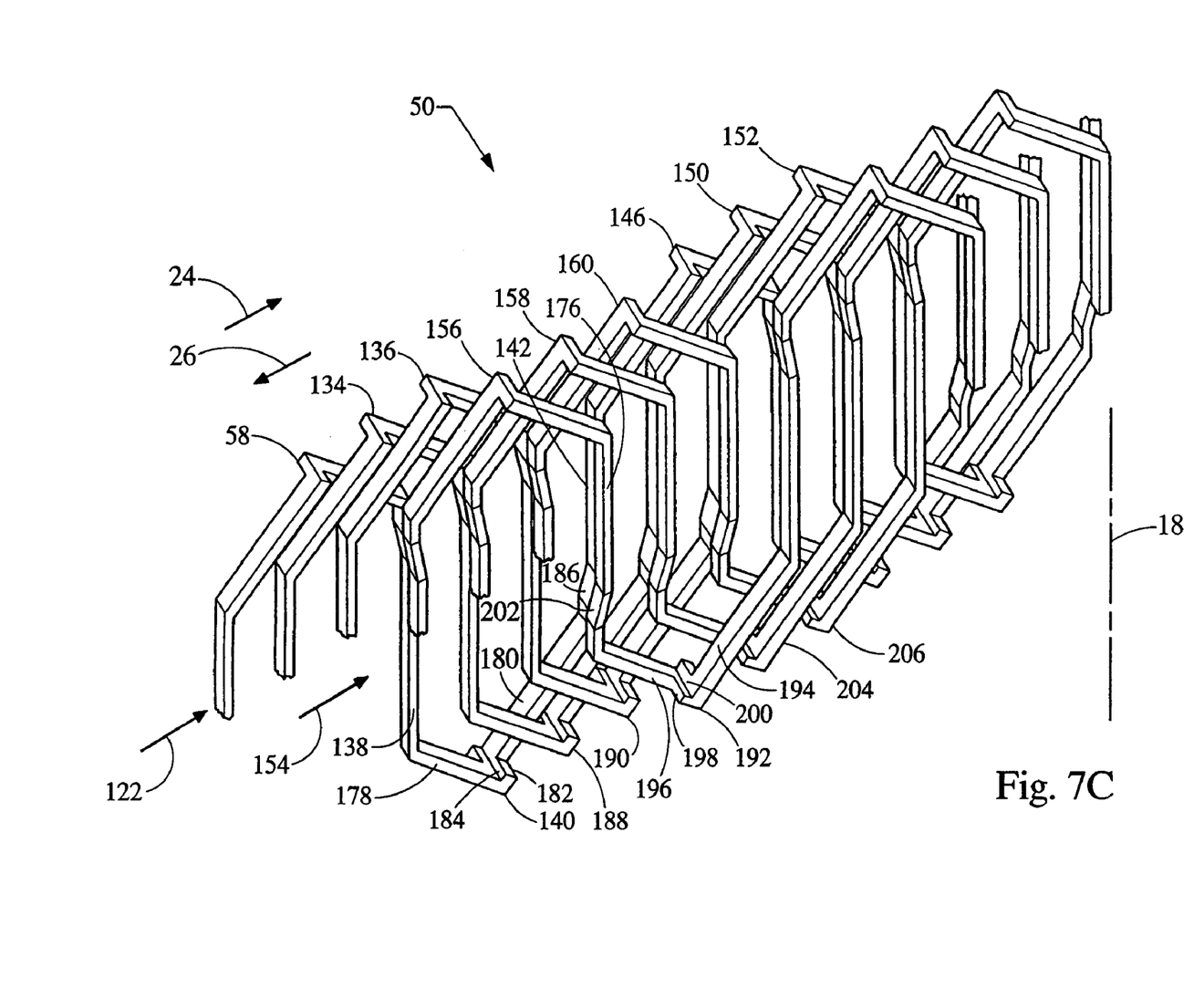
FIG. 7c is a perspective view of a plurality of layers of end loop segments of the stator winding shown in FIG. 7b including a plurality of slot segments and end loop segments in accordance with the present invention.

The cascaded winding 50 for the stator is shown in FIGS. 7 through 7c. Each of the continuous conductors has a plurality of slot segments disposed in the core slots 12. The term continuous, utilized herein, refers to a conductor including at least two end loop segments and connected to at least three slot segments that extends circumferentially around the core without any welds or connections. The slot segments are alternately connected at the first and second ends 20, 22 of the stator core 10 by a plurality of end loop segments. Each of the slot segments of a particular layer are located in the same radial position and therefore are likely to be at substantially the same radial distance from the central axis 18 of the stator core 10 and the end loop segments form a cascaded winding pattern. The term layer, utilized herein, refers to a conductor which extends circumferentially around the core including at least two end loop segments which connect at least three slot segments wherein the slot segments are located in the same radial position.

The stator core 10 of the present invention can have the winding 50 placed within the stator core 10 in a cascaded manner as described herein. Referring now to FIG. 7, the end loop segment, indicated generally at 58, is adapted to be a part of the stator winding 50 and includes a first substantially straight end portion 118 and a second substantially straight end portion 120 that are each proximate to a respective slot segment, discussed in more detail below, of the stator winding. The first end portion 118 and the second end portion 120 of the end loop segment 58 are at a substantially same radial distance from the central axis 18 of the stator core 21. The first end portion 118 and the second end portion 120 form a portion of a layer, indicated generally at 122, of the stator winding whose slot segments are located in the same radial position in the core slots 12. Although end portions, such as 118 and 120, are described as entities, they may, in fact, just be portions of the slot segments, discussed in more detail below.

The end loop segment 58 includes a first sloped portion 124 and a second sloped portion 126 that meet at an apex portion 128. The first sloped portion 124 is substantially co-radial with the slot segments of layer 122, the first end portion 118 and the second end portion 120. The second sloped portion 126 is substantially non-co-radial with the slot segments of layer 122, the first end portion 118 and the second end portion 120. The apex portion 128 includes a first radial extension portion 130. The first radial extension portion 130 extends from the first sloped portion 124 in the radially outward direction, which provides a radial outward adjustment for the end loop segment 58. A second radial extension portion 132 connects the second sloped portion 126 and the second end portion 120. The second radial extension portion 132 extends from the second sloped portion 126 in the radially inward direction, which provides a radial inward adjustment for the end loop segment 58. Although the radial extension portions, such as 130 and 132, shown in FIGS. 7, 7a, 7b, and 7c appear as sharp bends, it is obvious to those skilled in the art that typical radial extension portions would be more gentle in nature and include radii, not shown.

While the end loop segment 58 has been shown wherein the radial outward adjustment is adjacent the apex portion 128 and the radial inward adjustment is adjacent the second sloped portion 126, those skilled in the art can appreciate that the radial outward and inward adjustments can be on any one or on any two of the first sloped portion 124, the second sloped portion 126, and the apex portion 128 in order to provide the cascaded winding pattern, described in more detail below.

Referring now to FIG. 7a, the end loop segment 58 of FIG. 7 is shown adjacent a plurality of substantially identical end loop segments, indicated generally at 134 and 136. The end loop segments 58, 134, and 136 each form a portion of the layer 122 of the stator winding 50. The end loop segments 58, 134, and 136 are shown in a three-phase winding pattern but those skilled in the art will appreciate that the end loop segments 58, 134, and 136 may be formed in, for example, a six-phase winding pattern, or any other winding pattern advantageous for producing electricity or for generating torque, as in the case of an electric motor. In a three-phase winding the end loop segments typically, but not necessarily, have a pitch equal to three as can be best seen in FIG. 7a where end loop segment 140 connects, a slot segment 138 disposed in a first core slot with another slot segment 142 disposed in a core slot which is located three core slots from the first core slot. In a six-phase winding the end loop segments typically have a pitch equal to six. The end loop segments 58, 134, and 136 are preferably each disposed at the first end 20 of the stator core 10.

The portion 120 attaches to a first slot segment, shown schematically as 138, which extends through a one of the core slots 12 to the second end 22 of the stator core 10. As the first slot segment 138 exits the second end 22, the first slot segment 138 is attached to an end of another end loop segment, shown schematically at 140, which is described in more detail below. The end loop segment 140 is attached at another end to a second slot segment, shown schematically at 142. The second slot segment 142 extends upwardly through another one of the core slots 12 of the stator core 10 and attaches to a portion 144 of an end loop segment 146, which is substantially identical to the end loop segments 58, 134, and 136. Similarly, a portion 148 of the end loop segment 146 connects to another slot segment, discussed in more detail below. The pattern of connecting end loop segments 58, 140, and 146 and slot segments, such as the slot segments 138 and 142, as outlined above, continues about the circumference of the stator core 10 to form a first layer, such as the layer 122, of a single phase of the stator winding 50.

The end loop segment 146 is shown adjacent a plurality of substantially identical end loop segments, indicated generally at 150 and 152. The end loop segments 146, 150, and 152 are each connected to a corresponding plurality of slot segments, discussed in more detail below, such as the slot segments 142, which are each disposed in a respective core slot 12 of the stator core 10. The slot segments are attached to a plurality of end loop segments, discussed in more detail below. The end loop segments 134, 136, 150, and 152, when attached to the slot segments and end loop segments, each form a respective continuous first layer of the complete stator winding 50 that is wound about the circumference of the stator core 10.

Preferably, each of the slot segments 138 and 142 and each of the end loop segment 58, 134, 136, 140, 146, 150, and 152 are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

Referring now to FIGS. 7b and 7c, the first layer 122 of the end loop segments 58, 134, 136, 146, 150, and 152 of FIG. 7a, is shown with a second layer of end loop segments indicated generally at 154. The layer 154 is located radially inward of the layer 122 at a predetermined radial distance from the layer 122. The second layer 154 includes a plurality of end loop segments, indicated generally at 156, 158, and 160. The layers 122 and 154 together form a portion of the stator winding 50. The conductor of the second layer 154 including the end loop segment 156 is similar to the conductor of the first layer 122 including the end loop segment 58 except that it is inserted into the core slots 12, shifted by a predetermined number of slots, discussed in more detail below, and it has end loop segments on a first end of the stator core 10, such as the end loop segment 156, that extend radially outwardly at the apex portion 170 in the counterclockwise direction 26, which is opposite the end loop segments, such as the end loop segment 58, of the first layer 122, which extend radially outwardly at the apex portion 128 in the clockwise direction 24.

The end loop segment 156 includes a first sloped portion 166 and a second sloped portion 168 connected by an apex portion 170. The first sloped portion 166 is substantially co-radial with the slot segments of the second layer 154, the first end portion 165 and the second end portion 167. The second sloped portion 168 is substantially non-co-radial with the slot segments of the second layer 154, the first end portion 165 and the second end portion 167. The apex portion 170 includes a first radial extension portion 172. The first radial extension portion 172 extends from the first sloped portion 166 in the radially outward direction, which provides a radial outward adjustment for the end loop segment 156. A second radial extension portion 174 connects the second sloped portion 168 and the second end portion 167. The second radial extension portion 174 extends from the second sloped portion 168 in the radially inward direction, which provides a radial inward adjustment for the end loop segment 156.

As can best be seen in FIG. 7b, the non-co-radial portion 168 of end loop segment 156 extends radially outward where it becomes substantially co-radial with the slot segments of the first layer 122, the first end portion 118 and the second end portion 120, but because it is shifted by a predetermined number of slots, it does not violate the space of the end loop segments of the first layer 122. This allows the end loop segments of the two layers, 122 and 154 to cascade together forming a two layer winding 50, which extends radially outward by one substantial wire width beyond the slot segments of the first layer 122 but does not substantially extend radially inward beyond the slot segments of the innermost layer 154.

For a winding with a plurality of layers, a third layer (not shown) which is substantially identical to the first layer 122, would have non-co-radial portions that would extend radially outward and be substantially co-radial with the slot segments of the second layer 154 and therefore cascade with the second layer 154. For a pattern where the radial layers alternate between being substantially identical with the first layer 122 and the second layer 154, a pattern develops where the winding 50 only extends radially outward by one wire width for the outermost layer 122 but not radially inward of the slot segments of the innermost layer. This cascading effect allows a winding 50 with a plurality of layers to be inserted into a stator core 10, that extend radially outwardly by one substantial wire width while not extending radially inwardly. The end loop segments 158 and 160 are substantially identical to the end loop segment 156. The radial outward and inward adjustments for the layers 122, 154 form a cascaded winding pattern shown in FIGS. 7b and 7c.

Referring to FIG. 7c, the first layer 122 and the second layer 154 are shown with a plurality of slot segments 176, which are substantially identical to the slot segments 138 and 142. The end loop segment 140 of FIG. 7a is shown having a first sloped portion 178 and a second sloped portion 180 connected by an apex portion 182. The first sloped portion 178 is substantially co-radial with slot segments 138 and 142 of the first layer 122. The second sloped portion 180 is substantially non-co-radial with the slot segments 138 and 142 of the first layer 122. The apex portion 182 includes a first radial extension portion 184. The first radial extension portion 184 extends from the first sloped portion 178 in the radially outward direction, which provides a radial outward adjustment for the end loop segment 140. A second radial extension portion 186 connects the second sloped portion 180 and the slot segment 142. The second radial extension portion 186 extends from the second sloped portion 180 in the radially inward direction, which provides a radial inward adjustment for the end loop segment 140. The end loop segments 188 and 190 are substantially identical to the end loop segment 140.

Similarly, an end loop segment 192 of the second layer 154 is shown adjacent the end loop segment 190 of the first layer 122. The end loop segment 192 includes a first sloped portion 194 and a second sloped portion 196 connected by an apex portion 198. The first sloped portion 194 is substantially co-radial with the slot segments 176 of the second layer 154. The second sloped portion 196 is substantially non-co-radial with the slot segments 176 of the second layer 154. The apex portion 198 includes a first radial extension portion 200. The first radial extension portion 200 extends from the first sloped portion 194 in the radially outward direction, which provides a radial outward adjustment for the end loop segment 192. A second radial extension portion 202 connects the second sloped portion 196 and the slot segment 176. The second radial extension portion 202 extends from the second sloped portion 196 in the radially inward direction, which provides a radial inward adjustment for the end loop segment 192. The end loop segments 204 and 206 are substantially identical to the end loop segment 192.

The slot segments, such as 138, 142, and 176 of each phase of the stator winding 50 are preferably disposed in respective core slots 12 at an equal slot pitch around the circumference of the stator core 10. Specifically, a slot segment of a phase, such as the slot segment 138, is disposed in a respective core slot 12 adjacent a slot segment 139 of the adjacent phase. The respective slot segments 138 and 139 are spaced apart by a circumferential distance or slot pitch 208, best seen in FIG. 7a. The circumferential slot pitch 208 is substantially equal to the circumferential distance between a pair of adjacent core slots 12 in the stator core 20. Each of the slot segments and end loop segments of the phase including the slot segment 138 remain disposed adjacent the respective slot segments and end loop segments of the phase including the slot segment 139 at the same circumferential slot pitch 208 throughout the length of the stator winding 50 and throughout the circumference of the stator core 20.

While the slot segments 176 are shown generally coplanar in FIGS. 7b and 7c for illustrative purposes, the slot segments 176 are preferably adapted to be received by a radially curved surface, such as the interior surface of the stator core 10 and, therefore, are not coplanar but are co-radial. The width of each of the slot segments 176, including any insulation, preferably fits closely to the width of the core slots 12, including any insulation.

Figure 8:
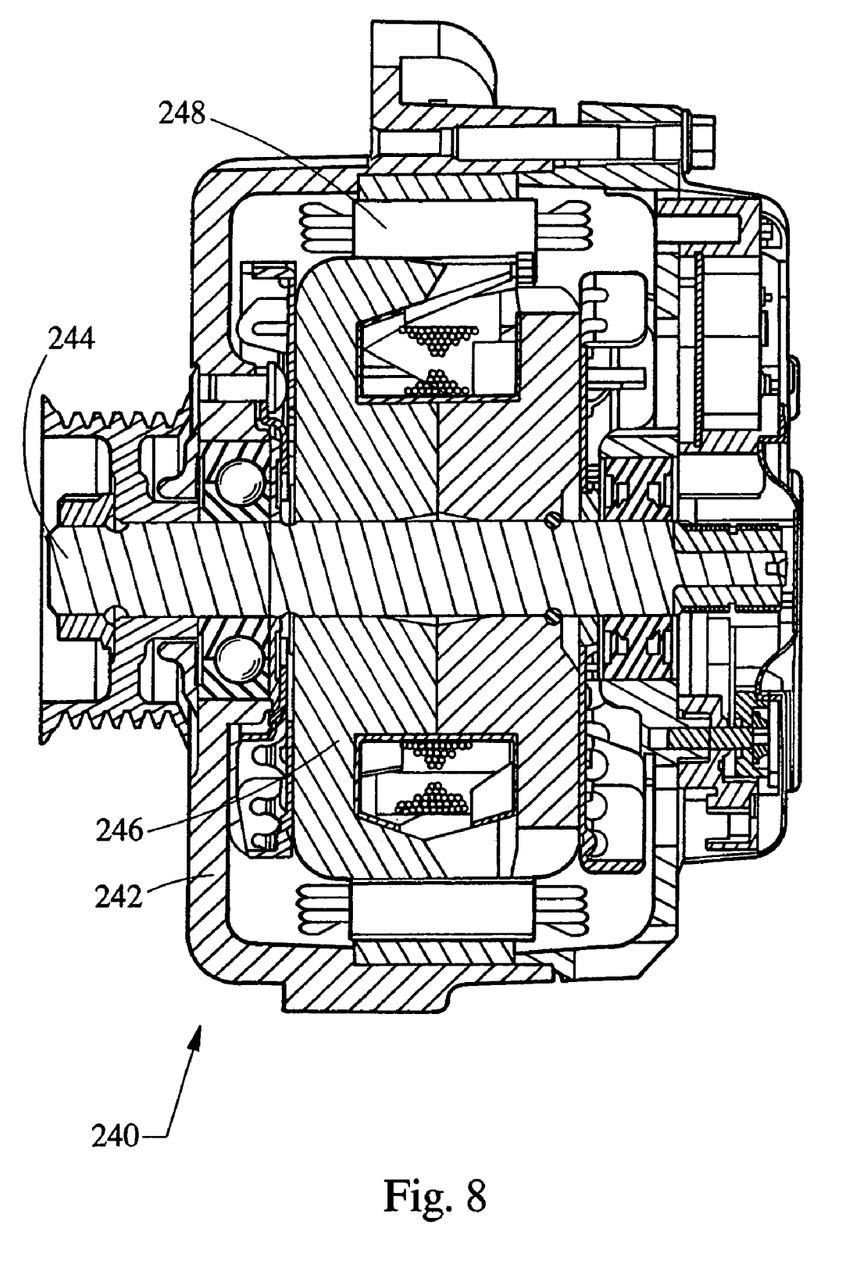
FIG. 8 is a cross sectional view of an alternator in accordance with the present invention.

Referring now to FIG. 8, a dynamoelectric machine in accordance with the present invention is indicated generally at 240. The dynamoelectric machine 240 is preferably an alternator, but those skilled in the art will appreciate that the dynamoelectric machine 240 can be, but is not limited to, an electric motor, a starter-generator, or the like. The dynamoelectric machine 240 includes a housing 242 having a shaft 244 rotatably supported by the housing 242. A rotor assembly 246 is supported by and adapted to rotate with the shaft 244. The rotor assembly 246 can be, but is not limited to, a "claw pole" rotor, a permanent magnet non claw pole rotor, a permanent magnet claw pole rotor, salient field wound rotor, or an induction type rotor. A stator assembly 248 is fixedly disposed in the housing 242 adjacent the rotor assembly 246. The stator assembly 248 includes a stator core, such as the stator core 10 and a winding, such as the stator winding 50.

In accordance with the provisions of the patent statutes, the present invention has been described in what is considered to represent its preferred embodiment. However, it should be noted that the invention can be practiced otherwise than as specifically illustrated and described.

What is claimed is:

1. A stator for an electric machine, comprising:
    a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
    a stator winding having a plurality of phases, each of the phases including a first set of conductors connected in parallel and a second set of conductors connected in parallel, the first set of conductors being connected in series to the second set conductors to define a single phase of the stator winding;
    the first set of conductors and the second set of conductors occupying adjacent slots within the stator core such that each single phase of the stator winding occupies two adjacent slots within the stator core;
    each individual conductor having a plurality of slot segments housed in the core slots, the slot segments alternately connected at the first and second ends of the stator core by a plurality of end loop segments.

2. The stator of claim 1 wherein the slot segments of the two conductors of each of the first and second sets of conductors alternate radial positions within respective slots within the stator core.

3. The stator according to claim 1 wherein the stator winding includes three phases, the three phases being connected to one another in a delta configuration.

4. The stator according to claim 3 wherein the three phase delta configuration is connected to a rectifier.

5. The stator according to claim 1 wherein the stator winding includes three phases connected to one another in a wye configuration having a single neutral point.

6. The stator according to claim 5 wherein the three phase wye configuration is connected to a rectifier.

7. The stator according to claim 1 wherein the stator winding includes three phases connected to one another in a wye configuration having two neutral points.

8. The stator according to claim 7 wherein the three phase wye configuration is connected to a rectifier.

9. The stator of claim 1 wherein at least half of the end loop segments connect a first slot segment housed in a radial position of a first core slot with a second slot segment housed in the same radial position of a second core slot.

10. The stator of claim 9 wherein at least half of the end loop segments each include at least one substantially sloped portion.

11. The stator of claim 10 wherein at least half of the end loop segments each include at least two radial adjustments.

12. The stator of claim 11 wherein at least half of the end loop segments have a pitch greater than three.

13. The stator of claim 12 wherein the conductors of the stator winding are cascaded.

14. The stator according to claim 1 wherein the slot segments housed in the core slots are aligned in a radial row and have a rectangular cross section.

15. The stator according to claim 1 wherein a width of the slot segments, including any insulation, fits closely to the width of the core slots, including any insulation.

16. The stator according to claim 1 wherein at least one of the conductors of a particular one of the phases is formed of a continuous conductor.

17. The stator according to claim 1 wherein the first set of conductors and the second set of conductors are shifted from one another by one slot such that the first set of conductors and the second set of conductors are out of phase with one another and define two phases of the stator core, the phases of the stator being connected in a delta configuration and connected to a rectifier.

18. The stator according to claim 1 wherein the first set of conductors and the second set of conductors are shifted from one another by one slot such that the first set of conductors and the second set of conductors are out of phase with one another and define two phases of the stator core, the phases of the stator being connected in a wye configuration and connected to a rectifier.

* * * * *